Oct. 4, 1955     E. M. RITTER     2,719,356

ELECTRIC DRY SHAVER

Filed Oct. 20, 1954

Inventor:
Ernst Michel Ritter,
by Pierce, Scheffler & Parker,
Attorneys.

United States Patent Office
2,719,356
Patented Oct. 4, 1955

2,719,356

ELECTRIC DRY SHAVER

Ernst Michel Ritter, St. Gallen, Switzerland, assignor to APAG, Apparatebau A. G. Goldach, Goldach, Switzerland Application October 20, 1954, Serial No. 463,519

Claims priority, application Switzerland November 24, 1953

5 Claims. (Cl. 30—43)

This invention relates to an electric dry shaver and more particularly to an electric dry shaver comprising two shells forming a housing which serves as a handle, clamping devices holding together said two shells, and an electric motor disposed inside the housing and having a laminated stator, an exciter winding on said stator, a laminated oscillating armature for moving the shaving cutter, and a pivot for articulating the oscillating armature on said stator.

Objects of the invention are to provide, in an electric dry shaver of the type stated, extensions on parts of the stator projecting in a direction away from the pivot between the stator and the oscillating armature, guiding means disposed on the inside of each of said shells of the housing for accommodating the ends of said extensions, members of elastic material inserted between the ends of said extensions and said guiding means, members of elastic material inserted between said pivot and each of said shells of the housing, and means for holding the pivot in a predetermined position with respect to said shells. Another object of the invention is an electric dry shaver comprising two shells forming a housing, clamping bolts holding together the two shells, an electric motor which lies clamped in resiliently between the two shells and having a laminated stator, an exciter winding on said stator, a laminated oscillating armature, and a pivot pin for articulating the armature on the stator; resilient members provided on said stator and projecting beyond the laminated part of the stator in a direction away from said pivot pin, guiding means disposed on the inside of each of said shells for accommodating said resilient members of the stator, a hole provided in each of the two shells for holding the projecting ends of the pivot pin, and intermediate layers of elastic material surrounding said pivot pin and located between the stator and each of the shells of the housing.

Figure 1:
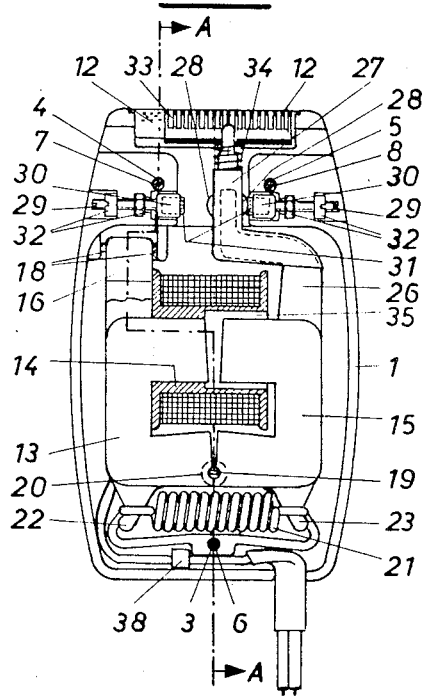
Figure 2:
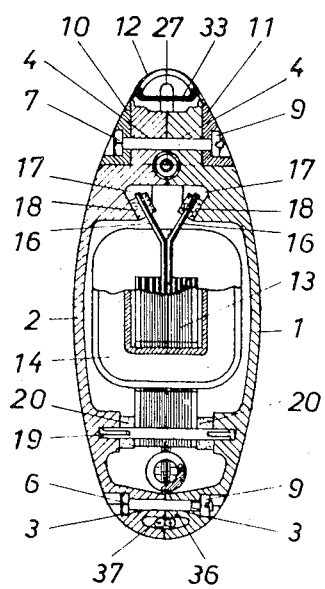
Figure 3:
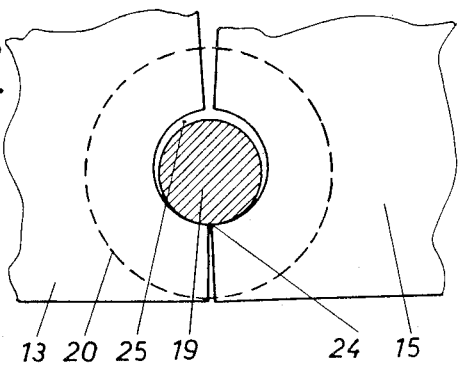

These and the other objects and the advantages of the invention will best be understood from the following description of a specific embodiment when read in connection with the accompanying drawing in which:

Fig. 1 is an interior view of the dry shaver, with one shell of the housing removed and some parts illustrated in section, Fig. 2 is a broken cross-section on the line A—A in Fig. 1 showing both shells of the housing, and Fig. 3 shows the direct surroundings of the link between the stator and the oscillating armature, on an enlarged scale in comparison with Figs. 1 and 2.

The two shells 1 and 2 of the housing are symmetrically identical (Fig. 2), so that the usual distinction between upper and lower shell can no longer be made. The two shells 1 and 2 each have three holes 3, 4, 5 which serve to accommodate the clamping bolts 6, 7 and 8 (Fig. 1). With the aid of the latter and their nuts 9 (Fig. 2) the shells 1 and 2 of the housing are secured together. By means of the clamping bolts 7 and 8 the strips 10 and 11 are also pressed against the shells 1 and 2, and clamp the sieve-cutter 12 between themselves and said shells.

The electric motor consists primarily of a stator 13, which is constructed of laminated iron and carries the exciter winding 14, and of the oscillating armature 15, which is likewise laminated. The drawing shows an electric motor for alternating current. Some of the midfdle laminae of the stator 13 have extensions 16 (Figs. 1 and 2) which project beyond the other laminae of said stator and which are angled off from the laminar plane in pairs in opposed directions, so that the angled off ends of the extensions 16 have V-shaped positions with respect to one another (Fig. 2). In each of the two shells 1 and 2 of the housing and on the insides thereof are mounted guides in the form of recesses 17 (Fig. 2) in which the extensions 16 rest with a rubber pad 18 interposed. The rubber pads 18 may have the form of caps or rings inverted over the ends of the extensions 16. Instead of using rubber for the resilient elements 18 use may be made of any other elastic and noise-damping material. The extension parts which are angled off are also resilient to a certain extend so that when the shells 1 and 2 of the housing are bolted together, the resilient members 18 are compressed and the extensions 16, which are bent apart in the shape of a V, are slightly pushed together at their ends. The resilient members 18 and the extensions 16 accordingly bring about a resilient clamping of the stator 13 at the part thereof facing the sieve-cutter 12.

As a further mounting position for the oscillating armature motor one has proved particularly suitable in the region of the pivot situated between the stator 13 and the oscillating armature 15. This pivot, which is shown on an enlarged scale in Fig. 3, has a pivot pin 19. The projecting ends of the pivot pin 19 are slotted and engage resiliently in corresponding holes provided in each of the shells 1 and 2 (Fig. 2). Furthermore, as shown in Fig. 2, a disc-shaped intermediate layer 20 of rubber or another elastic material is inserted between each of the two shells 1 and 2 on the one hand and the outermost laminae of the stator 13 and the oscillating armature 15 on the other hand. These intermediate layers are penetrated and hence guided by the pivot pin 19. The two rubber inserts 20 are dimensioned in such manner that when the two shells 1 and 2 of the housing are bolted together they are pressed together by means of the peg-shaped attachments of the housing (Fig. 2). Since the rubber insets 20 press on both the stator 13 and the armature 15, the stator 13 and the oscillating armature 15 are resiliently clamped. The vibrations occasionally occurring with oscillating armature motors in the region of their pivot and causing a loud noise are thus eliminated. On the reciprocating movement of the oscillating armature 15 the latter rolls on the stator 13 since the pivot pin 19 has a little clearance 25 between the semi-circular indentations in the stator 13 and the oscillating armature 15 (Fig. 3). By virtue of the extensions 16, which are forced apart in the shape of a V, and the wedge-shaped recesses 17 (Fig. 2), the stator 13 is pulled in the direction towards the sieve-cutter 12, so that point 24 (Fig. 3) lies against the pivot pin 19 resiliently as well. This is conditional on the extensions 16 projecting in a direction away from the pivot pin 19, as may be seen from Fig. 2 particularly. This arrangement is also advantageous because in view of the torque acting on the stator 13 the resilient rings or caps 18 should be as remote as possible from the resilient inserts 20.

Finally, as shown in Fig. 1, one or a plurality of the middle laminae of the oscillating armature 15 have an arm 26 which is bent over the exciter winding 14 and carries at its end a cap 27 which is pressed or cast on. The cap 27 consists of an electrically insulating material and preferably of a polyamide synthetic plastic such as is known under the names "nylon," "Perlon," "Grilon" and the like. In its middle part the cap 27 has bulges 28 after the style of spherical segments, which are situated opposite the stroke limiting buffers. The latter consist of bolts 29 which carry rubber blocks 31 in their hollow heads and lie together with their fastening nuts 32 in recesses adapted to this purpose in the shells 1 and 2. The free pin-shaped end of the cap 27 engages in a corresponding opening in the shaving cutter 33 (Fig. 2) and the latter is pressed by means of the helical compression spring 34 against the inner wall of the sieve-cutter 12. The exciter winding 14 is pressed on the arm, remote from the pivot pin 19, of the stator 13 and has an enlarged aperture 35 in which the corresponding arm of the oscillating armature 15 can swing freely. Fig. 1 shows the position of rest of the oscillating armature 15 without the exciter winding 14 being energised. In this position of rest the oscillating armature 15 bears against one of the two stroke limiting buffers 31, owing to the tension spring 21. If, however, alternating current flows through the exciter winding 14, the cap 27 assumes a middle position between the two stroke-limiting buffers 31 and carries out reciprocating pendulum oscillations to both sides relative to said middle position. The supply cable for the electrical connection of the exciter winding 14 is secured against tension in front of the crosspiece 36 in a recess 37 provided in the shells 1 and 2 (Fig. 2) by means of a knot or the like (Fig. 1).

The hereinbefore described construction ensures noise-free operation and the perceptible vibrations of the housing 1, 2 are slight. The mounting of the oscillating armature motor, which is resilient and effected without the aid of bolts or rivets, also permits a simple and inexpensive construction of the entire dry shaver, since all the other parts thereof can be secured without any disadvantages directly in or on the shells 1 and 2. The shells are made of a synthetic plastic which is capable of being cast and/or pressed. Hardenable and electrically insulating synthetic resins are particularly advantageous for producing the shells 1 and 2 of the housing.

The invention is not limited to the particular embodiments here shown and described. Various modifications may be made without departing from the spirit and scope of the invention as set forth in the following claims.

I claim:

1. An electric dry shaver comprising two shells forming a housing which serves as a handle, clamping bolts holding together said two shells, an electric motor disposed inside said housing and having a laminated stator, an exciter winding on said stator, a laminated oscillating armature having a shaving cutter secured thereto, and a pivot pin for articulating said oscillating armature on said stator; resilient members provided on said stator and projecting beyond the laminated part of said stator in a direction away from said pivot pin, guiding means disposed on the inside of each of said shells for accommodating said resilient members of the stator, each of said shells having a hole therein for holding the projecting ends of said pivot pin, and intermediate pads of elastic material surrounding said pivot pin and located between the stator and each of said shells of the housing.

2. An electric dry shaver as recited in claim 1, wherein the projecting ends of said pivot pin are slotted and engage resiliently in the corresponding holes provided in each of said shells.

3. An electric dry shaver as recited in claim 1, wherein said resilient members are stator laminae having extensions projecting beyond the other stator laminae.

4. An electric dry shaver comprising two shells forming a housing which serves as a handle, clamping means holding together said shells, an electric motor disposed inside said housing and having a laminated stator, an exciter winding on said stator, a laminated oscillating armature having a shaving cutter secured thereto, and a pivot for articulating said oscillating armature on said stator; extensions provided on parts of said stator and projecting in a direction away from said pivot, guiding means disposed on the inside of each of said shells for accommodating the ends of said extensions, members of elastic material inserted between the ends of said extensions and said guiding means, pads of elastic material inserted between said pivot and each of said shells of the housing, and means for holding said pivot in a predetermined position with respect to said shells.

5. An electric dry shaver as recited in claim 4, wherein said extensions are angled off in opposed directions to form a V, and wherein said guiding means are wedge-shaped recesses adapted to said V-shape and serving for accommodating said members of elastic material.

References Cited in the file of this patent

UNITED STATES PATENTS

| 2,265,932 | Wahl | Dec. 9, 1941 |
| 2,283,551 | Hanley | May 19, 1942 |

FOREIGN PATENTS

| 625,419 | Great Britain | June 28, 1949 |